United States Patent [19]

Chambers

[11] Patent Number: 4,718,806
[45] Date of Patent: Jan. 12, 1988

[54] CYLINDRICAL BALE LOADING AND TRANSPORT APPARATUS

[76] Inventor: Roger D. Chambers, Rte. 1, Box 334, Pioneer, Tenn. 37847

[21] Appl. No.: 886,831

[22] Filed: Jul. 18, 1986

[51] Int. Cl.⁴ .......................... A01D 87/12; B60P 1/48
[52] U.S. Cl. .................................... 414/24.5; 414/501; 414/510; 414/525 R; 414/552; 414/718; 414/750
[58] Field of Search ...................... 414/24.5, 111, 24.6, 414/489, 492, 501, 510, 512, 517, 518, 522, 525 R, 552, 718, 750; 198/775

[56] References Cited

U.S. PATENT DOCUMENTS

| | | | |
|---|---|---|---|
| 3,924,765 | 12/1975 | Hostetler | 414/24.5 |
| 4,103,794 | 8/1978 | Shaw | 414/24.5 X |
| 4,143,760 | 3/1979 | Hallstrom | 198/775 X |
| 4,394,103 | 7/1983 | Butler et al. | 414/24.5 |
| 4,549,840 | 10/1985 | Ansbjer | 414/24.5 |
| 4,573,845 | 3/1986 | Carpenter | 414/24.5 |

*Primary Examiner*—Frank E. Werner
*Assistant Examiner*—Janice Krizek
*Attorney, Agent, or Firm*—Pitts and Brittian

[57] ABSTRACT

A cylindrical bale loading and transport apparatus for being towed by a conventional tractor or the like having a hydraulic system. The apparatus (10) includes a frame (12) which carries wheels (14) to facilitate movement of the apparatus (10) over a supporting surface. A loading mechanism (30) is provided for moving bales from the supporting surface to the apparatus (10). The bales (46) are then conveyed or transported sequentially towards the aft portion (82) of the apparatus for storage during transport. These bales (46) can be readily loaded, stored, and off-loaded by a single operator.

9 Claims, 12 Drawing Figures

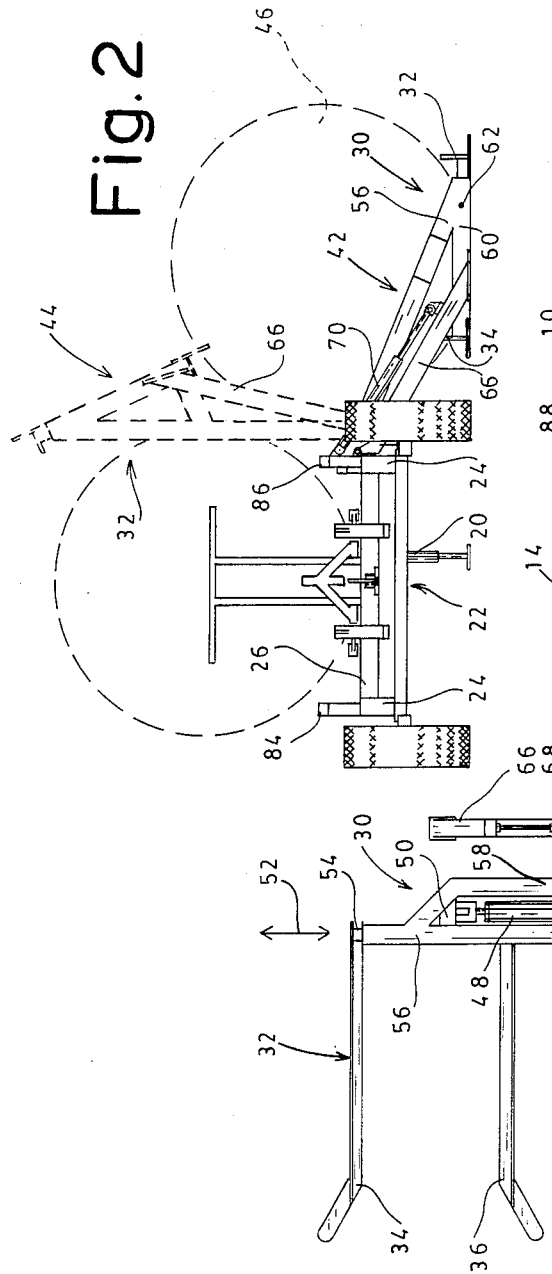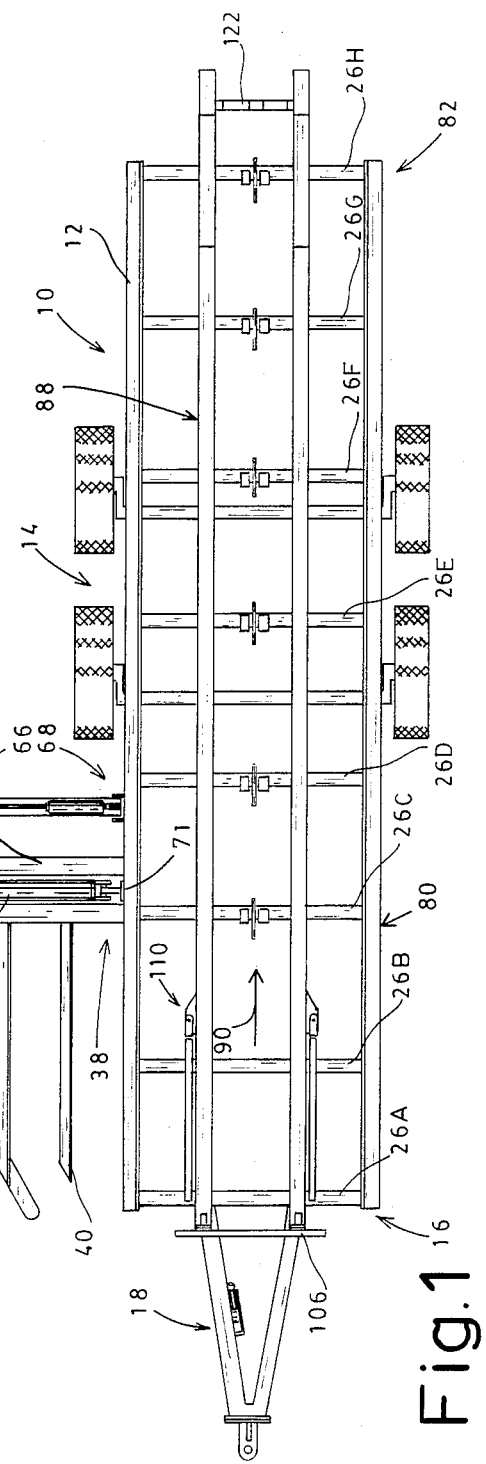

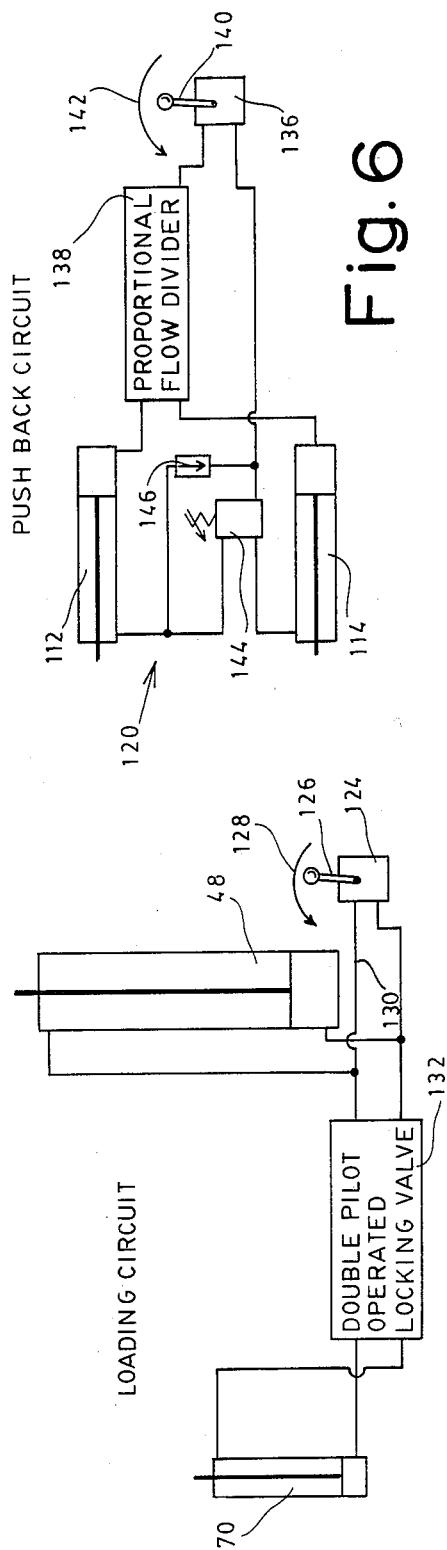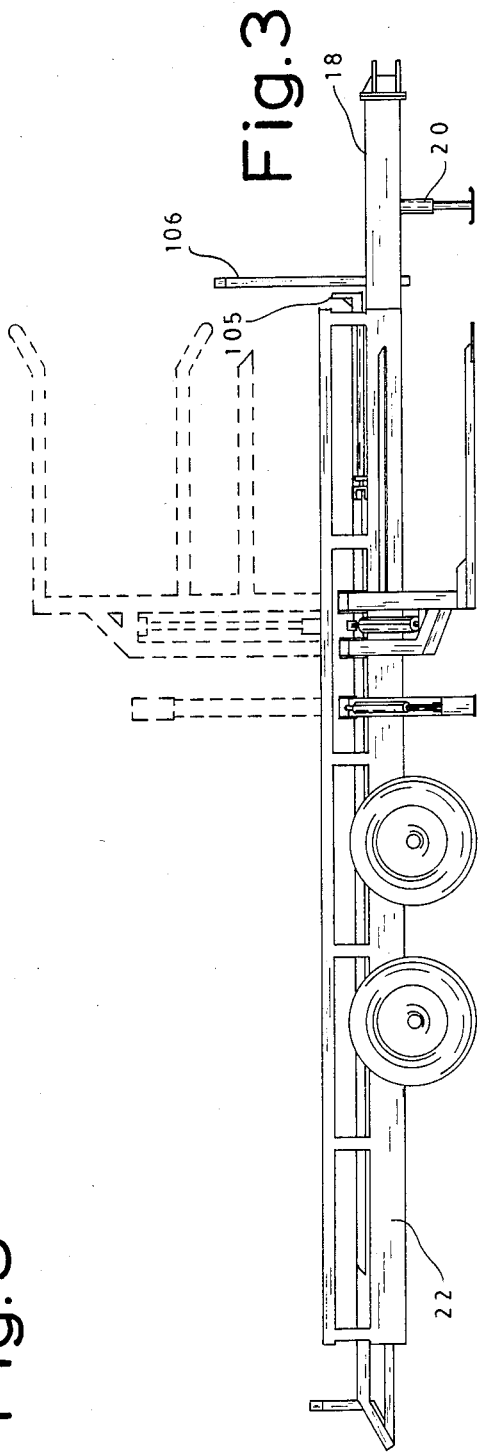

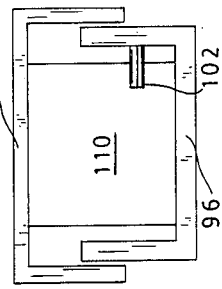
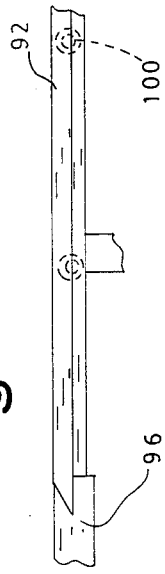
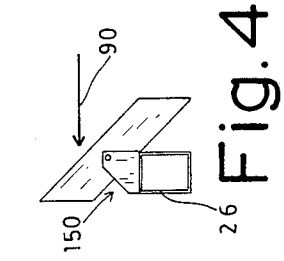
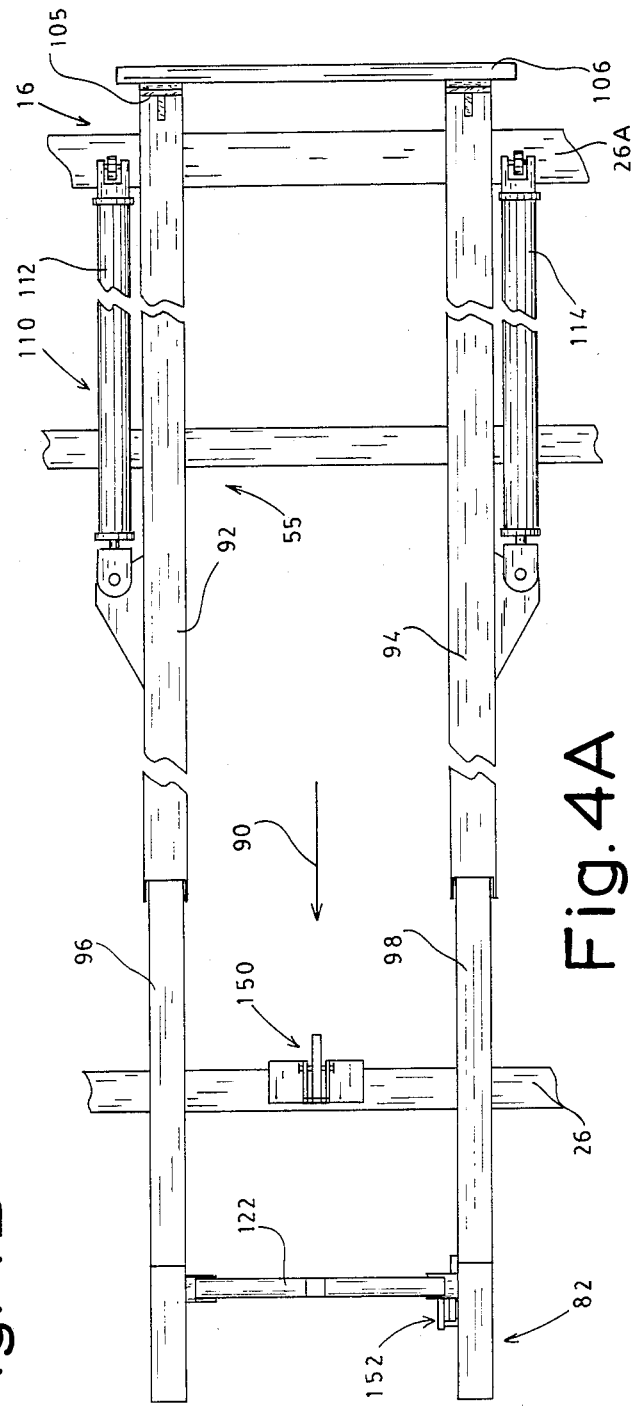

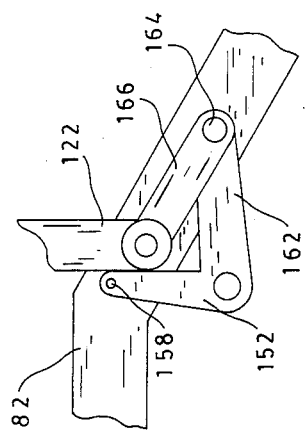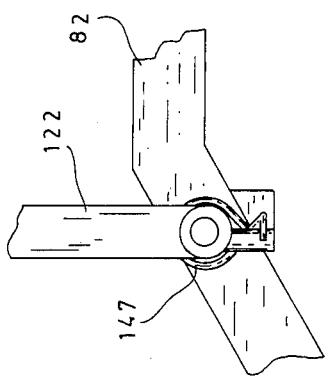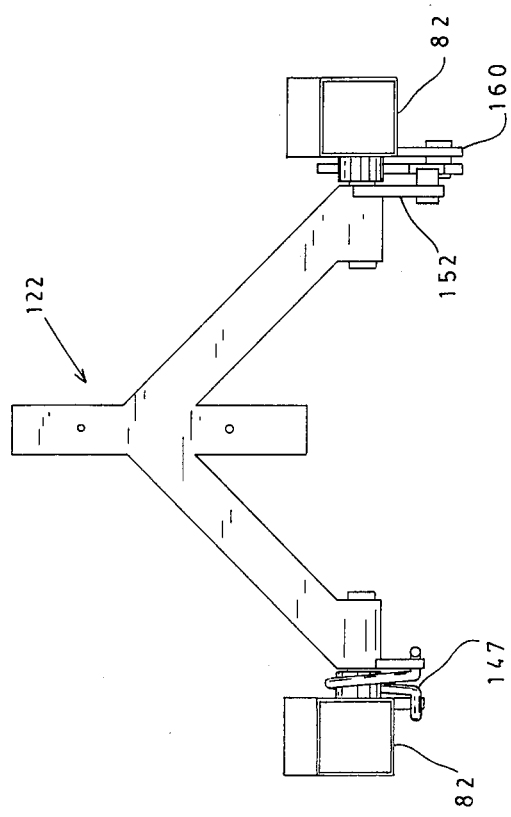

CYLINDRICAL BALE LOADING AND TRANSPORT APPARATUS

TECHNICAL FIELD

This invention relates generally to a bale or haystack loading and transport apparatus adapted for being towed by a conventional tractor or the like having a hydraulic system, and more particularly concerns such a device having improved features for loading, conveying and off-loading bales or haystacks.

BACKGROUND ART

Machinery has heretofore been known and used for storing and/or transporting hay, straw, or other forage material baled in cylindrical bales or haystacks, as they are commonly referred to in the trade. These bales are of substantial weight, and present particular problems in loading, storing and off-loading. Heretofore, various prior art devices have been known for loading and/or transporting bales. Exemplary prior art devices are described and illustrated in the following U.S. Pat. Nos.: 3,924,765, issued to Dewey L. Hostetler on Dec. 9, 1975; 4,076,138, issued to Ben K. Honomichl, Sr., on Feb. 28, 1978; 4,249,842, issued to Howard L. Johnson on Feb. 10, 1981; 4,261,676, issued to Bernard L Balling, Sr., on Apr. 14, 1981; 4,500,242, issued to Douglas L. Beikman on Feb. 19, 1985; and 4,549,840, issued to Jan Ansbjer on Oct. 29, 1985.

Certain of the prior art devices are difficult to manufacture, and expensive to maintain, inasmuch as the heavy cylindrical bales or haystacks produce substantial stress and wear on the apparatus used in loading and transporting such bales. It will also be noted that certain prior art devices include complex systems for loading, storing and off-loading the bales.

The present invention is designed to provide a cylindrical bale or haystack loading and transport apparatus which is adapted for being towed by a conventional tractor or the like having a hydraulic system. The apparatus is designed to be light weight and operated by a single operator.

Another object of the present invention incorporates a feature which facilitates the movement of the cylindrical bales or haystacks in an aft direction such that the bales are readily stored and off-loaded.

Other objects and advantages of the invention will become apparent upon reading the detailed description together with the referenced drawings.

DISCLOSURE OF THE INVENTION

In accordance with various features of the present invention, a cylindrical bale loading and transport apparatus is provided. This apparatus is adapted for being towed by a conventional tractor or the like having a hydraulic system operatively associated therewith. The apparatus includes a frame having a forward end portion and an aft end portion. The frame carries wheels to facilitate movement of the apparatus over a supporting surface. A loading mechanism is provided for loading the cylindrical bales onto the apparatus. At such point, the bales are selectively conveyed in an aft direction for storage. The conveying mechanism assists in preventing a drag back of the bales as the conveyor is returned to its position for receiving, in sequence, additional bales. The additional bales are pushed towards the aft of the apparatus, and can be readily off-loaded by dropping the tailgate, or another suitable travel limiting mechanism, such that the rearward most bale is pushed off of the apparatus by operation of the conveyor mechanism.

BRIEF DESCRIPTION OF THE DRAWINGS

FIG. 1 is a plan view of an apparatus constructed in accordance with various features of the present invention.

FIG. 2 illustrates an end view of the apparatus shown in FIG. 1 and the movement of the mechanism for loading the cylindrical bales.

FIG. 3 illustrates a side elevation of the apparatus depicted in FIG. 1 with the loading mechanism shown in an extended and retracted position.

FIGS. 4A–4D illustrate various features of the conveyor mechanism.

FIG. 5 illustrates a section of the control means designed for operating the loading mechanism.

FIG. 6 illustrates a section of the control means designed for operating the conveyor which serves to push back the cylindrical bales or haystacks after they have been loaded on the apparatus depicted in FIG. 1.

FIGS. 7A–7C illustrate the tailgate catch or release mechanism which can be remotely operated by a tractor driver.

BEST MODE FOR CARRYING OUT THE INVENTION

Referring now to the figures, a loading and transport apparatus constructed in accordance with various features of the present invention is illustrated generally at 10 in FIG. 1. More specifically, this apparatus 10 is particularly suited for loading, transporting and off-loading cylindrical bales of hay or other forage. These bales are formed by conventional farm apparatus, and normally moved to storage locations on a farm, or to locations where they are deposited for feeding livestock. The bales can weigh several hundreds of pounds each, and one feature of the present invention is to provide a light weight, yet strong, apparatus 10 which is useful for loading, transporting and off-loading such heavy cylindrical bales or haystacks.

In this connection, the apparatus 10 includes a frame 12 which is substantially rectangular in cross-sectional configuration as illustrated in the plan view depicted in FIG. 1. This frame 12 carries the wheels generally illustrated at 14 which are of conventional design and serve to facilitate movement of the apparatus over a supporting surface such as the field of a farm.

The frame 12 includes a forward end portion 16 which carries a tongue 18 of substantially conventional design. This tongue in the illustrated embodiment is V-shaped, and carries at its outboard forward end portion a clevis suitable for being mechanically connected to a mating member (not shown) carried by a conventional tractor or the like, such that upon mechanical connection of the tongue to the tractor, the apparatus 10 can be towed over a supporting surface. An extendible foot member 20 is carried by the tongue 18. This foot member 20 serves to support the tongue when the apparatus 10 is parked.

As shown in FIGS. 1 through 3, the frame 12 includes a substantially rectangular carriage section 22 to which the axles of the wheels 14 are attached. This carriage section is fabricated from substantially rigid bar members 24 which extend along the length of the frame. These bar members are substantially parallel and are joined by a plurality of cross members 26 as illustrated in FIGS. 1 and 2. These cross members 26 serve to strengthen the carriage section 22 of the frame such that it is capable of supporting a plurality of cylindrical bales which are loaded onto the apparatus 10.

To this end, loading means generally indicated at 30 in FIG. 1 is provided. The loading means serves to engage and lift a cylindrical bale onto the apparatus 10 proximate the forward end portion 16 of the frame 12. More specifically, the loading means 30 comprises a loading fork 32 having a plurality of tines 34, 36 which are moved into engagement as by movement under a cylindrical bale. This fork 32 is pivotally mounted on the frame 12 at the location 38. The fork further carries an elevated tine 40 which assures a proper roll and placement of the bale on the apparatus 10 during the loading operations. This fork 32 is hydraulically driven between its extended position illustrated at 42, and the retracted position illustrated at 44 in FIG. 2. More specifically, when the loading fork 32 is in the extended position, the apparatus 10 can be moved forward such that the tines 34, 36 of the fork 32 engage the cylindrical bale 46. After these tines have been moved under the bale such that the fork properly engages it, the fork is retracted to the position indicated at 44 for loading the bale 46 onto the apparatus 10 for storage and transport. The hydraulic cylinder 48 of conventional design is provided for this purpose. The precise operation and control mechanism operatively associated with the hydraulic cylinder 48 will be described in greater detail hereinafter. It will, however, be noted that this cylinder includes one end portion which is mechanically connected to the frame as illustrated at 71 in FIG. 1 and a further end portion connected to the piston arm of the cylinder which is mechanically and pivotally connected to the fork crossbar member 50 illustrated in FIG. 1. Thus, the hydraulic cylinder 48 is selectively operated to move the loading arm into the extended position 42 and into the retracted position 44 illustrated in FIG. 2 for loading bales onto the apparatus.

In accordance with another feature of the present invention, the outboard tine 34 is adjustable in the direction of the arrow 52 such that the tines can be spaced for receiving variously sized bales or bales that have a flatter bottom due to age or material condition. More specifically, the loading fork 32 includes a member 54 which is slidably received within the fork member 56 which is connected at its opposite end portion depicted at the location 38 to the frame 12. Adjustment of the relative spacing between the tines 34 and 36 of the fork 32 enhances the degree of engagement of a bale by the fork. It will be noted in FIG. 1 that this fork member 56 which is mechanically connected to the frame 12 also includes a support member 58 which reinforces the fork. The cross member 50 serves to interconnect members 56 and 58 for additional reinforcement.

It will, of course, be recognized that the loading means or arm 30 can assume various geometric configurations. The depicted loading arm includes a base 60 which is joined with, or intergrally formed, at its outboard portion with member 56 described hereinabove. In the embodiment depicted in FIG. 2, the tine 32 is slidably received within a suitable opening provided proximate the junction of member 56 and base member 60 as shown in FIG. 2. The relative spacing between the tine 32 and the tine 34 is fixed by the adjustment pin 62.

I will also be noted in FIG. 2 that this base member 60 carries the tine 34 which is operatively associated with the tine 32.

In accordance with another feature of the present invention, a stabilizer arm 66 is pivotally mounted on the frame at the location 68. This stabilizer arm 66 is moved to the extended position shown in the lower portion of FIG. 2 during the movement of the loading fork 32 from the position 42 to the position 44 as shown in FIG. 2. In this connection, the apparatus 10 is prevented from tipping over or tilting during movement of the heavy bale 46 onto the frame. After the loading operation is complete, the stabilizer arm 66 is moved to the retracted position shown in the upper portion of FIG. 2 proximate the position 44 of the retracted loading fork 32. In this connection, a suitable hydraulically driven cylinder 70 is mechanically connected to the frame 12 proximate the location 68 illustrated in FIG. 1. The outboard end portion of this cylinder 70, or more specifically the piston arm of the cylinder, is mechanically connected to the stabilizer arm 66 as illustrated in FIG. 2 such that this arm can be selectively moved between its extended and retracted positions as is desired.

Conveyor means generally indicated at 80 serve to receive and convey the loaded bale 46 from the location proximate the forward end portion 16 of the frame 12 towards the aft portion 82 of the frame 12 at which point, the bale can be selectively off loaded. To this end, the conveyor means 80 includes a pair of guide rails 84 and 86 which are mounted in substanially parallel relationship on the bar members 24 which extend along the length of frame 12. These guide rails 84 and 86 serve as guide means to assist in preventing the bale from inadvertently rolling off the sides of frame 12 and to further assist in guiding the movement of the bale from the forward end portion 16 to the aft end portion 82 of the frame. This movement is accomplished by suitable transport means 88 which engage a loaded bale and selectively move the bale, as will be described in greater detail, along the length of the frame. More specifically, the transport means 88 serves to move a loaded bale from the forward end portion 16 in the direction of the arrow 90 towards the aft end portion 82 of the frame as shown in FIG. 4A. It will be noted that the apparatus 10 has been pivoted 180 degrees between FIG. 1 and FIG. 4A. This transport means generally indicated at 88 includes a pair of moving rails 92 and 94 which are carried by guide rails 96 and 98, respectively. It will be noted that these guide rails 96 and 98 are supported on the frame cross members 26 and extend the length of the frame from the forward end portion 16 to the aft end portion 82.

The moving rails 92 and 94 slide or roll along the length of their operatively associated guide rails 96 and 98. In this connection, suitable rollers 100 are interposed as illustrated in FIG. 4D between the moving rail 92 and the supporting guide rail 96. The moving rail 94 is similarly constructed and mounted for movement along the supporting guide rail 98. These rollers 100 have their travel limited by placement of suitable stops such as 102 at spaced locations along the length of the guide rail 96. It will be noted in FIG. 4D that in the preferred embodiment, the floating rail and the supporting guide rail are fabricated from channel iron portioned such that the moving rail 92 overlaps the supporting guide rail 96 and sandwiches the roller 100 therebetween.

A suitable engaging foot 105 is mounted on the moving rails 92 and 94 as illustrated in FIGS. 3 and 4A. This engaging foot engages the forward most end portion of a cylindrical bale 46 after it has been loaded onto the forward end portion 16 of the apparatus 10. Thus, as the moving rails 92 and 94 are driven forward in the direction of the arrow 90 the engaging foot 105 transports the most recently loaded bale in the direction of this arrow 90 by the length equivelent to the stroke of the operatively associated cylinders which drive the moving rails 92 and 94.

In order to move the moving rails 92 and 94 in the direction of the arrow 90 for transporting a loaded bale which is received upon these moving rails 92 and 94 proximate the forward end portion 16 of the apparatus 10, suitable drive means are provided. In the depicted embodiment, the drive means is generally indicated at 110. This drive means 110 is operatively associated with the loading means 30 and the conveyor means 80 for selectively activating the loading means to load the cylindrical bale onto the apparatus and then convey or transport these loaded bales to preselected locations along the length of the frame. A portion of the drive means 110 which is operatively associated with the transport means 88 which serves to convey or transport the cylindrical bales along the length of the frame 12 which includes the pair of hydraulic cylinders 112 and 114 is depicted in FIG. 4A. Each of these cylinders is of conventional design and mechanically connected at one end portion to the cross member 26A depicted in FIG. 4A. The opposite end portion of the cylinder or more specifically the end portion of the piston operatively associated with the cylinder is mechanically connected to a depending portion of the moving rails 92 and 94 as shown in FIG. 4A. (Also see FIG. 1). Thus, upon operation of the drive means 110 a cylindrical bale loaded onto the moving rails 92 and 94 is engaged by the engaging foot 105 and moved rearward a length equivelent to the length of a stroke of these cylinders 112 and 114.

The drive means 110 includes a suitable control 120 which is operatively associated with the hydraulic system of the tractor. This control serves to selectively activate the loading means and the conveyor means by loading and moving or transporting cylindrical bales to preselected locations along the length of the apparatus and for further allowing the bales to force the tailgate means 122 down to off load the bales as will be described in greater detail below. The drive means 110 and the control means 120 will now be described in connection with FIGS. 5 and 6 taken together with a balance of the Figures which illustrate the mechanical apparatus which is operatively associated with such controls. As an operator positions the apparatus 10 for loading a bale, he activates the auxiliary valve 124 which is mounted on a conventional tractor having a hydraulic system. As he pushes the auxiliary valve lever 126 in the direction of the arrow 128, pressure is applied through line 130 which causes the loading arm cylinder to retract and thereby lower the fork 32 to the ground or to the position 42 shown in FIG. 2. When the base member 60 of the fork 32 touches the ground prior to being moved under a cylindrical bale, the operator will return the lever 126 to the upright position as shown in FIG. 5, and drive under the bale with the loading fork such that the bale is engaged and ready to be lifted. When he is fully under the bale he will again move the lever 126 in the direction of the arrow 128 which causes the double pilot operated locking valve 132, which is of conventional design, to open. This will cause the stabilizer arm cylinder 70 to extend its operatively associated piston and thereby move the stabilizer arm into position for stabilizing the apparatus 10 as is shown in FIG. 2. The operator is now ready to load a bale onto the apparatus. He then moves the lever 126 in a direction opposite the arrow 128 causing the cylinder 48 to extend and raise the loading arm such that the hay bale will roll onto the trailer over the elevated tine 40. At this time the locking valve 132 will hold the stabilizing cylinder in its position until the loading cylinder 48 reaches its fully extended position thereby causing a pressure buildup resulting in an opening of the double pilot operated locking valve 132 allowing the stabilizer arm 66 to raise to the transport position indicated proximate the arrow in FIG. 2.

Referring now to FIG. 6, in order to transport a hay bale aft of the apparatus, the operator engages a second auxiliary valve 136 which is mounted on the tractor (not shown). The hydraulic pressure flows through a proportional flow divider 138 which causes the two push back cylinders 112 and 114 to extend at the same rate. These cylinders will extend their operatively associated piston arm to move the moving rails simutaneously in the aft direction, and continue the extention process until they reach a full extended position or until the operation is terminated at the operator's discretion. To return the rails back to the position for receiving another hay bale, the operator will move the auxiliary valve lever 140 in a direction opposite the direction of the arrow 142. This hydraulic circuit shown in FIG. 6 is designed such that cylinders 112 and 114 will not move back to their retracted position simultaneously, rather one will operate or move to its retracted position first through the operation of a pressure by-pass valve 144. When the first cylinder first returns to its fully retracted position, then the hydraulic pressure will build up in the by-pass valve 144 and cause the second cylinder to return to its fully retracted position for receiving an additional bale. When an operator wishes to move cylinders 112 and 114 to their fully retracted position, the staggering of the movement of the moving rails through the operation of these cylinders is caused by a combination of the pressure by-pass valve coupled with the free return check valve 146. More specifically, the pressure by-pass valve 144 will allow one cylinder to retract holding the other cylinder at the fully extended position until the first cylinder has hit its fully retracted position and the pressure buildup opens the pressure relief valve and allows the second cylinder to retract.

Thus, the two push back cylinders 112 and 114 will operate together until they reach their full stroke, or until the operator decides to terminate their movement. On the return stroke, one moving rail is caused by its operatively associated cylinder to return to its original position first. It must completely return to its position before the other rail can be moved rearwardly. This reduces the likelihood that the hay bale will be returned upon movement of the moving rails towards the position in which they receive an additional loaded bale.

It will also be noted that a plurality of dowels generally indicated at 150 are mounted on the cross members 26. These dowels more clearly depicted in FIG. 4B are pivotally mounted on the cross members 26. It will be noted that as the hay bale is moved in the direction indicated by the arrow 90, the dowels will allow the hay bale to travel over it. Upon retraction of the moving rails 92 and 94, gravity will cause the dowel to assume the position indicated in FIG. 4B such that movement of the hay bale in a direction opposite of the direction of arrow 90 is prohibited. Thus, these dowels, in combination with the staggered movement of the moving rails towards their original position facilitate placing the bales at preselected locations along the length of the frame and maintaining that position until again the bales are fed in the aft direction.

Another feature of the present invention is to provide a retractable travel limiting or tailgate means generally indicated at 122 which serves to terminate the aft movement of the bales until off-loading is desired. More particularly, the tailgate 122 is preferably spring biased towards an upright position by the spring 147 shown in FIGS. 7A and 7C, and provided with a suitable catch generally indicated at 152 which serves to prevent the tailgate from moving until off-loading is desired. When it is desired to off-load the bales, the tailgate 122 can be pivoted to allow bales to be moved over it such that they can be deposited on the supporting surface proximate the aft end portion 82 of the apparatus 10.

More specifically, the catch 152 is substantially L-shaped and is pivotally mounted as shown in FIG. 7B on the aft portion of the frame. One arm of the L-shaped catch 152 defines an opening 158 which receives a string or cord that extends to the tractor driver. Upon pulling this cord, which is not shown, the catch 152 pivots and releases the tailgate 122 such that only the force of the spring 147 holds it upright. Thus, movement of a bale in an aft direction will then override the spring and cause the tailgate to pivot downwardly to allow off-loading of the bales. In this connection, it will be noted that the catch 152 is pivotally mounted on the support bracket 160, and includes an end portion 162 which engages the post 164 of the tailgate extension member 166 until the catch 152 is pivoted by the tractor driver and the tailgate is permitted to pivot for off-loading the bales. It will be noted that the bales can be off-loaded one at a time or multiple bales can be off-loaded at the same location.

From the foregoing description detailed description, it will be recognized by those skilled in the art that a preferred embodiment has been described and illustrated, and that it is not intended that the scope of the invention be limited other than by the appended claims and the equivalence thereof.

I claim:

1. A cylindrical bale loading and transport apparatus adapted for being towed by a conventional tractor or the like having a hydraulic system, said apparatus comprising:

a frame having a forward end portion, an aft end portion and side portions;

wheel means rotatably mounted on said frame to facilitate movement of said apparatus over a supporting surface;

loading means pivotally carried by one of said side portions of said frame proximate said forward end portion thereof for loading bales on said apparatus, said loading means having a loading fork foamed of a plurality of tines for movement into engagement with a lower surface of said bales and a hydraulic pivoting means attached between said frame and said fork to move said fork from a stored position above said frame to an extended position to engage said bales and to load said bales upon said apparatus, said hydraulic pivoting means operatively connected to a first control unit of said hydraulic system for operation by a user of said apparatus;

conveyor means for sequentially receiving said bales loaded onto said apparatus by said loading means and for conveying said bales toward said aft end portion to a preselected location along the length of said frame for storage during transport, said conveyor means including first and second parallel moving rail means adapted to be reciprocated along said frame, and individual hydraulic means fastened between said frame and each of said moving rail means and operatively connected to a second control unit of said hydraulic system, said second control unit providing for movement of said moving rail means toward said aft end portion simultaneously and return toward said forward end portion one at a time to minimize forward movement of said bales as said moving rail means are retracted toward said forward end portion; and passive stop means for stopping movement of said bale, after being loaded, toward said forward end portion as said moving rail means are retracted to a position for receiving another bale from said loading means, said stop means comprising a plurality of gravity-biased dowels pivotally mounted from said frame, each dowel having a first end projecting above said frame in the absence of said bale and being retracted toward a top surface of said frame in the presence of said bale and during movement of said bale toward said aft end portion, said first end pivoting into engagement with said bale during any movement of said bale toward said forward end portion to stop further forward movement of said bale during said retraction of said moving rail means.

2. The apparatus of claim 1 wherein said frame includes a tongue proximate said forward end portion for mechanically connecting said frame of said apparatus to said tractor.

3. The apparatus of claim 1 further comprising a stabilizing means pivotally carried by said frame proximate said loading means for preventing tilting of said apparatus as said bales are loaded by said loading means, said stabilizing means having an arm pivotally connected to said frame and adapted for movement between a retracted position above said frame to an extended position in contact with said supporting surface near a center of gravity of said bale and a second hydraulic pivoting means attached between said frame and said arm operatively connected to said first control unit of said hydraulic system, said first control unit adapted to move said arm to said extended position after said fork has been moved to said extended position and to move said arm to said stored position after said loading fork has been moved to said stored position for depositing a bale upon said conveyor means.

4. The apparatus of claim 1 wherein each said moving rail means has a bale engaging foot member at a forward end wherein said bale loaded onto said frame is received by said moving rail means and selectively moved rearwardly along said frame by activating said second control unit to drive said moving rail means and said foot members rearwardly.

5. The apparatus of claim 1 further including travel limiting means for selectively limiting travel of said bale along the length of said frame, said travel limiting means comprising a tailgate for said apparatus, said tailgate being selectively pivoted from an upright position to restrain said bale on said frame to an extended positon to allow said bale to be off-loaded from said apparatus proximate said aft end portion of said frame.

6. A cylindrical bale loading and transport apparatus adapted for being towed by a conventional tractor or the like having a hydraulic system, said apparatus comprising:
- a frame having a forward end portion, an aft end portion and side portions;
- a tongue proximate said forward end portion of said frame for mechanically connecting said frame of said apparatus to said tractor;
- wheel means rotatably mounted on said frame to facilitate movement of said apparatus over a supporting surface;
- loading means pivotally carried on one of said side portions of said frame proximate said forward end portion for loading bales on said apparatus, said loading means having a loading fork formed of a plurality of tines for movement into engagement with a lower surface of said bales and a hydraulic pivoting means attached between said frame and said fork to move said loading fork from a stored position above said frame to an extended position to engage said bales and to load said bales upon said apparatus, said hydraulic pivoting means operatively connected to a first control unit of said hydraulic system for operation of a user of said apparatus;
- conveyor means for sequentially receiving said bales loaded onto said apparatus by said loading means and for conveying said bales to a preselected location along the length of said frame for storage during transport, said conveyor means including guide means for guiding movement of said bales along the length of said frame, and further including bale transport means for moving said bale along the length of said guide means, said transport means including first and second parallel moving rail means carried by said frame, each moving rail means having a bale engaging foot member at a forward end, wherein said bale loaded onto said frame is received by said moving rail means and selectively moved rearwardly along said frame, said transport means further including individual hydraulic means fastened between said frame and each of said moving rail means, said hydraulic means operatively connected to a second control unit of said hydraulic system for operation by a user of said apparatus, said second control unit providing for movement of said moving rail means toward said aft end portion of said frame simultaneously and return toward said forward end portion one at a time to minimize forward movement of said bales as said moving rail means are retracted toward said forward end portion; and
- passive stop means for stopping movement of a bale toward said forward end portion as said moving rail means and said bale engaging foot members are retracted to a position for receiving another bale from said loading means, said stop means comprising a plurality of gravity-biased dowels pivotally mounted from said frame, each of said dowels having a first end projecting substantially vertically above said frame in the absence of said bale, said end being pivoted downwardly toward a top surface of said frame in the presence of said bale and during movement of said bale toward said aft end portion, said first end pivoting upwardly into engagement with said bale during any movement of said bale toward said forward end portion to stop further movement of said bale during said retraction of said moving rail means.

7. The apparatus of claim 6 further including travel limiting means for selectively limiting travel of said bale along the length of said guide means, said travel limiting means comprising a tailgate for said apparatus, said tailgate being selectively pivoted from an upright position to restrain said bale on said frame to an extended position to allow said bale to be off-loaded from said apparatus proximate said aft end portion of said frame.

8. The apparatus of claim 6 further including a stabilizer means pivotally carried by said frame proximate said loading means for preventing tilting of said apparatus as said bales are loaded by said loading means, said stabilizer means comprising:
- an arm pivotally connected to said frame and adapted for movement between a retracted position above said frame to an extended position in contact with said supporting surface; and
- a second hydraulic pivoting means attached between said frame and said arm and operatively connected to said first control unit of said hydraulic system, said first control unit adapted to move said arm to said extended position after said loading fork has been moved to said extended position and to move said arm to said retracted position after said loading fork has been moved to said stored position for depositing said bales upon said conveyor means.

9. A cylindrical bale loading and transport apparatus adapted for being towed by a conventional tractor or the like having a hydraulic system, said apparatus comprising:
- a frame having a forward end portion including a tongue for mechanically connecting said frame of said apparatus to said tractor, an aft end portion and side portions;
- wheel means rotatably mounted on said frame to facilitate movement of said apparatus over a supporting surface;
- loading means pivotally carried on one of said side portions of said frame proximate said forward end portion for loading bales on said apparatus, said loading means having a loading fork formed of a plurality of tines for movement into engagement with a lower surface of said bales, and a hydraulic pivoting means attached between said frame and said loading fork to move said loading fork from a stored position above said frame to an extended position to engage said bales and to lift said bales upon said apparatus, said hydraulic pivoting means operatively connected to a first control unit of said hydraulic system for operation by a user of said apparatus;
- a stabilizer means pivotally carried by said frame proximate said loading means for preventing tilting of said apparatus as said bales are loaded by said loading means, said stabilizer means including an arm pivotally connected at one end to said frame and adapted for movement between a retracted position above said frame to an extended position in contact with said supporting surface, and a second hydraulic pivoting means attached between said frame and said arm and operatively connected to said first control unit of said hydraulic system, said first control unit adapted to move said arm to said extended position after said loading fork has been moved to said extended position and to move said arm to said retracted position after said loading fork has been moved to said stored position for depositing said bales upon said frame;

conveyor means for sequentially receiving said bales loaded onto said frame by said loading means and for conveying said bales to a preselected location along the length of said frame for storage during transport, said conveyor means including guide means for guiding movement of said bales along the length of said frame, and further including bale transport means for moving said bale along the length of said guide means, said transport means including first and second parallel moving rail means carried by said frame, each said moving rail means having a bale engaging foot member toward said forward end portion of said frame, and said moving rail means provided with hydraulic means connected between said frame and each of said moving rail means, with said hydraulic means operatively connected to a second control unit of said hydraulic system, said second control unit providing for movement of said first and second moving rail means toward said aft end portion simultaneously and return one at a time toward said forward end portion to minimize forward movement of said bales as said moving rail means are retracted toward said forward end portion;

stop means for stopping movement of a bale toward said forward end portion of said frame as said moving rail means and said bale engaging foot members are retracted to a position for receiving another bale from said loading means, said stop means comprising a plurality of gravity-biased dowels pivotally mounted from said frame, each said dowel having a first end projecting substantially vertically above said frame in the absence of said bale and being pivoted downwardly toward a top surface of said frame in the presence of said bale and during movement of said bale toward said aft end portion, said dowels pivoting upwardly into engagement with said bale during any movement of said bale toward said forward end portion to stop further movement of said bale during said retraction of said moving rail means; and travel limiting means for selectively limiting travel of said bale along the length of said guide means, said travel limiting means comprising a tailgate for said apparatus, said tailgate adapted for selective pivoting from an upright position to restrain a rear bale on said frame to an extended position to allow said rear bale to be off-loaded from said apparatus proximate said aft end portion of said frame, said tailgate having a releasable catch operable by said user of said apparatus to effect said pivoting to said extended position for said off-loading.

* * * * *